United States Patent [19]
Karafiath et al.

[11] Patent Number: 6,038,995
[45] Date of Patent: Mar. 21, 2000

[54] COMBINED WEDGE-FLAP FOR IMPROVED SHIP POWERING

[75] Inventors: Gabor Karafiath, Silver Spring; Dominic S. Cusanelli, Frederick, both of Md.

[73] Assignee: The United States of America as represented by the Secretary of the Navy, Washington, D.C.

[21] Appl. No.: 08/948,013

[22] Filed: Oct. 10, 1997

[51] Int. Cl.[7] .................................................. B63B 1/00
[52] U.S. Cl. ........................................ 114/271; 114/285
[58] Field of Search ............................. 114/56, 271, 284, 114/285, 286, 287, 291

[56] References Cited

U.S. PATENT DOCUMENTS

| | | | |
|---|---|---|---|
| 4,896,622 | 1/1990 | Thomas | 114/271 |
| 4,961,396 | 10/1990 | Sasagawa | 114/285 |
| 5,628,272 | 5/1997 | Thomas | 114/285 |

OTHER PUBLICATIONS

Karafiath, G and Fisher, S.C., "The Effect of Stern Wedges on Ship Powering Performance," Naval Engineers Journal, May 1987, vol. 99, No. 3, pp. 27–38.

Righter, J.R., JR and Compton, R., "The Effects of a Bow Bulb and a Stern Wedge on a Large Water Plane Transom Sterned Hullform," U.S. Naval Academy Report EW–25–82, Oct. 1982.

Casanelli, D.S. "Integrated Wedge–Flap, An Energy Saving Device," Prepared for 21st UJNR Marine Facilities Panel Meeting, Tokyo, Japan, May 17–28, 1997.

Cusanelli, D.S. and Karafiath, G., "Integraded Wedge–Flap for Enhanced Powering Performance,Prepared for Fast '97, Fourth International Conference on Fast Sea Transportation," Sidney, Australia, Jul. 21–23, 1997.

Cusanelli, D.S., "Stern Flap Powering Performance on the PC 1 Class Coastal, Full Scale Trials and Model Experiments", Prepared for Patrol '96 Conference, New Orleans, LA, Dec. 5–7, 1996.

Cusanelli, D.S., "DDG 51 Fleet Design with ATD Propellers Ship/Model Correlation and Experiments on Transom Wedge–Stern Flap Combination (Model 5513)," Carderock Div, NSWC, CRDKNSWC/HD–1269–02, Nov. 1996.

Cusanelli, D.S. and Forgach, K.M, "Stern Flaps for Enhanced Powering Performance", Twenty–Fourth American Towing Tank Conference, College Station, Texas, Nov. 2–3, 1995.

Cave, III, W.L. and Cusanelli, D.S., "Effect of Stern Flaps on Powering Performance of the FFG–7 Class", Marine Technology, vol. 30, No. 1, Jan. 1993, pp. 39–50.

*Primary Examiner*—Jesus D. Sotelo
*Attorney, Agent, or Firm*—Howard Kaiser

[57] ABSTRACT

The inventive combination of a stern wedge and a stern flap demonstrates hydrodynamic properties which, for purposes of enhancing the powering performance of a ship, are superior to those of either a solitary stern wedge or a solitary stern flap. For many inventive embodiments, the stern wedge portion's lower surface and the stern flap portion's lower surface are slanted at approximately equal angles with respect to the buttock centerline, thereby optimally consolidating the stern portion's lower surface and the flap portion's lower surface so as to effectively create an overall hydrodynamic lower surface which is slanted approximately at one and the same angle.

18 Claims, 5 Drawing Sheets

COMBINED WEDGE-FLAP FOR IMPROVED SHIP POWERING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the hydrodynamics of marine vessels, more particularly to adjuncts, appendages and auxiliary devices for affecting same.

Structural additions of various kinds and configurations have been implemented for various types of marine vessels in order to improve powering performance. Some very small pleasure craft and planing boats have been provided with adjustable trim flaps (trim tabs) for controlling the trim. As for combatant vessels, during World War II some small German ships were provided with stern wedges for the purpose of improving powering performance. Until the early 1980's, however, neither stern wedges nor stern flaps were known to be pursued by anyone for combatant ships of the frigate/destroyer size (approximately 3,000 to 10,000 Long Tons displacement).

In the 1980's some foreign navies began to successfully apply stern wedges to larger ships up to the frigate size. In addition, the U.S. Navy began to explore possibilities regarding auxiliary structure for enhancing powering performance of larger (frigate/destroyer sized) ships. See Righter, J. R., Jr. and R. Compton, "The Effects of a Bow bulb and Stern Wedge on a Large Waterplane, Transom Sterned Hullform," U.S. Naval Academy Report, EW-25-82 (October 1982), incorporated herein by reference; Karafiath, G. and S. C. Fisher, "The Effect of Stern Wedges on Ship Powering Performance," Naval Engineers Journal (May 1987), incorporated herein by reference. Based on the research efforts presented in the paper by Karafiath and Fisher, supra, the U.S. Navy designed the Arleigh Burke (DDG 51) Class destroyer with a stern wedge inlaid into the hull; many of these twenty-seven designed DDG 51's are already built. Model tests demonstrated that implementation of such a stern wedge resulted in a reduction of power of up to a maximum of about 6% at speeds above 24 knots.

A stern wedge design was initially attempted by the U.S. Navy for the FFG 7 frigate class; however, in the course of model testing it was discovered that a stern flap was more effective than a stern wedge on this class. The model tests demonstrated approximately a 5% decrease in delivered power at speeds of 20 knots and above. In 1989, a stern flap was designed and retrofitted by the U.S. Navy on the USS Copeland frigate (FFG 25). Analysis of the ship trials data for the USS Copeland frigate having a retrofitted stern flap indicated an 8% power saving, somewhat greater than the model test results, and increased top end speed. See Cusanelli, D. S., and W. M. Cave, III, "Effect of Stern Flaps on Powering Performance of the FFG-7 Class," Marine Technology, Vol. 30, No. 1 (January 1993), incorporated herein by reference.

A stern flap design was selected through model testing for full scale retrofit to the PC 1 Class Patrol Coastal. The retrofit of a stern flap on the Shamal (PC 13) showed that the flap would reduce required delivery power by 5.6% and increase top speed and range on this class. See Cusanelli, D. S., "Stern Flap Powering Performance on the PC 1 Class Patrol coastal, Full Scale Trials and Model Experiments," PATROL '96 Conference, New Orleans, La. (December 1996), incorporated herein by reference. Subsequent to the above-noted investigation regarding the Shamal, the U.S. Navy has tested various stern flaps at CDNSWC on several models of various ship types. These model tests have not only shown that significant energy savings are possible with stern flaps, but have also provided valuable insights into stern flap operational mechanisms. See, e.g., the paper by Cusanelli (December 1996), supra; Cusanelli, D. S., and K. M. Forgach, "Stern Flaps for Enhanced Powering Performance," Twenty-Fourth American Towing Tank Conference, College Station, Tex. (November 1995), incorporated herein by reference.

Although the aforedescribed results have been encouraging, the U.S. Navy has continued to seek better ways for improving ship powering performance.

SUMMARY OF THE INVENTION

In view of the foregoing, it is a principal object of the present invention to reduce the shaft power required to propel a ship, thereby reducing the engine fuel consumption.

Prior to the present invention, wedges and flaps have represented discrete concepts and have been used exclusively of each other. This invention features the novel implementation of a wedge-flap combination for enhancing the powering performance of marine vessels.

The present invention is especially contemplated for utilization in connection with large combatant ships of frigate/destroyer dimensions. This invention was originally motivated by the U.S. Navy's desire to even further improve the powering performance of the above-mentioned Arleigh Burke (DDG 51) Class AEGIS Guided Missle Destroyer, Flight 1 design, which has already been provided with an inlaid transom wedge.

In accordance with the present invention, a combination is provided for affecting the hydrodynamics of a hullform having a hull aftside and a hull underside which converge at a stern corner. The inventive combination comprises wedge means and flap means. The wedge means is below the hull underside and at least substantially before the hull aftside. The flap means is at least substantially behind the hull aftside. The wedge means has a wedge undersurface and a wedge aft-periphery. The flap means has a flap undersurface and a flap fore-periphery. The wedge aft-periphery and the flap fore-periphery are each contiguous the stern corner. The hull underside has associated therewith an approximate longitudinal bisector passing therethrough. The wedge undersurface and the flap undersurface are each obliquely oriented with respect to the approximate longitudinal bisector.

For many inventive embodiments, it is propitious to dispose the wedge portion and the flap portion at approximately equal angles with respect to the slope of the local centerline buttock, thereby practically effecting a consolidated bottom wedge-flap surface which unites the individual bottom surfaces of the wedge and the flap, and which is characterized by approximately the same angle with respect to the slope of the local centerline buttock.

The main advantage of the inventive combined wedge-flap is that it affords a greater reduction in shaft power than does either the wedge acting alone or the flap acting alone. Solitary wedge operation, solitary flap operation and inventive combined wedge-flap operation share similar hydrodynamic principles, except that the inventive combined wedge-flap results in greater powering improvement in comparison with either the solitary wedge or the solitary flap.

The key parameters which affect the performance of a solitary wedge, a solitary flap or an inventive combined wedge-flap, are: (i) the chord length(s); (ii) the span length (s); (iii) the angle(s) relative to the buttock lines (e.g., buttock centerline); (iv) the planform shape(s); and, (v) the thickness shape(s). Of particular note regarding shape are the configurational fairing details (e.g., at locations outboard, near the transom's bottom edge, etc.).

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
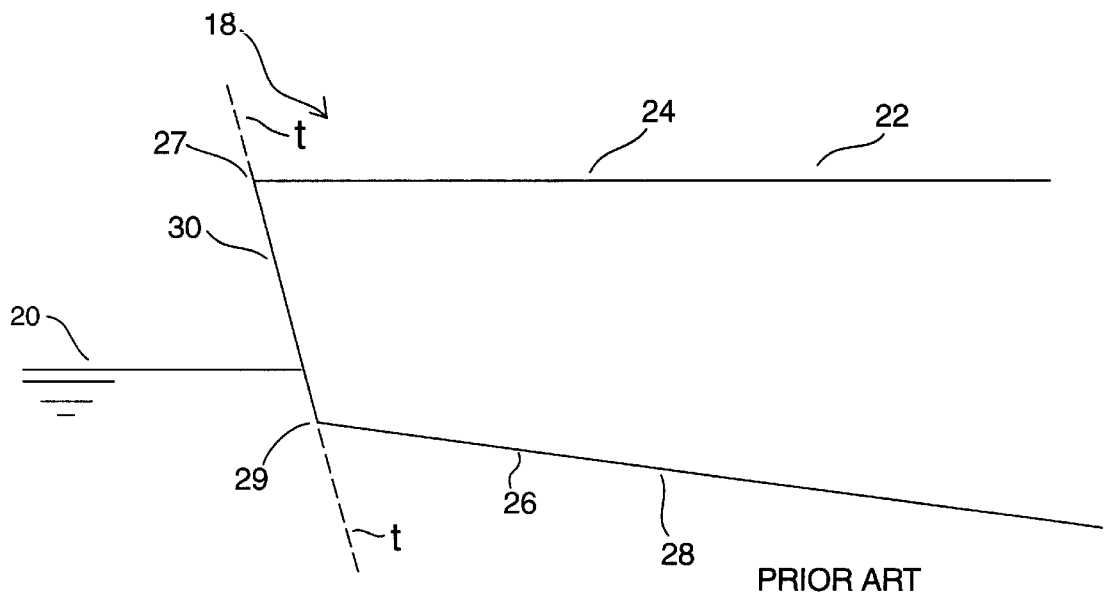
FIG. 1 is a highly diagrammatic, partial (stern), side elevation view of a typical hullform of a large combatant ship.

Referring now to FIG. 1, ship 18 is navigating a sea having waterline 20. Hull 22 of ship 18 includes main deck 24, (local) buttock centerline 26, hull bottom 28 and transom 30. Deck 24 and transom 30 meet at upper aft transverse edge 27; i.e., upper aft transverse edge 27 is the corner (junction) formed by the intersection of transom 30 and deck 24. Hull bottom 28 and transom 30 meet at lower aft transverse edge 29; i.e., lower aft transverse edge 29 is the corner (junction) formed by the intersection of transom 30 and hull bottom 28.

Figure 2:
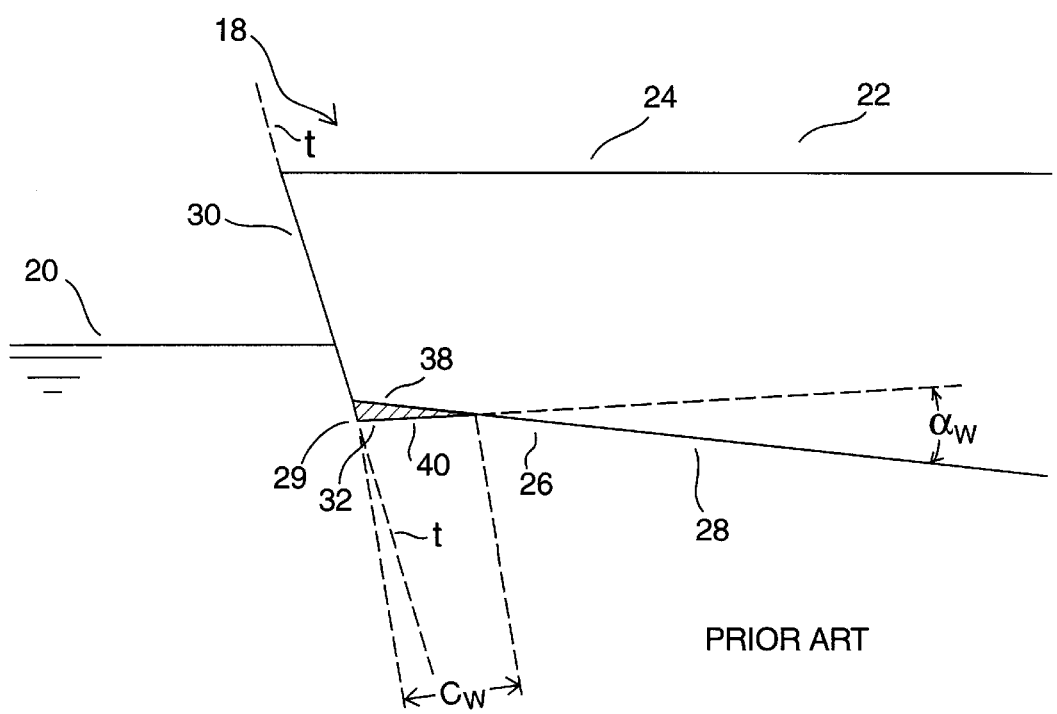
FIG. 2 is a view, similar to the view shown in FIG. 1, of the ship shown in FIG. 1, wherein the hullform is provided with a stern wedge.
Figure 3:
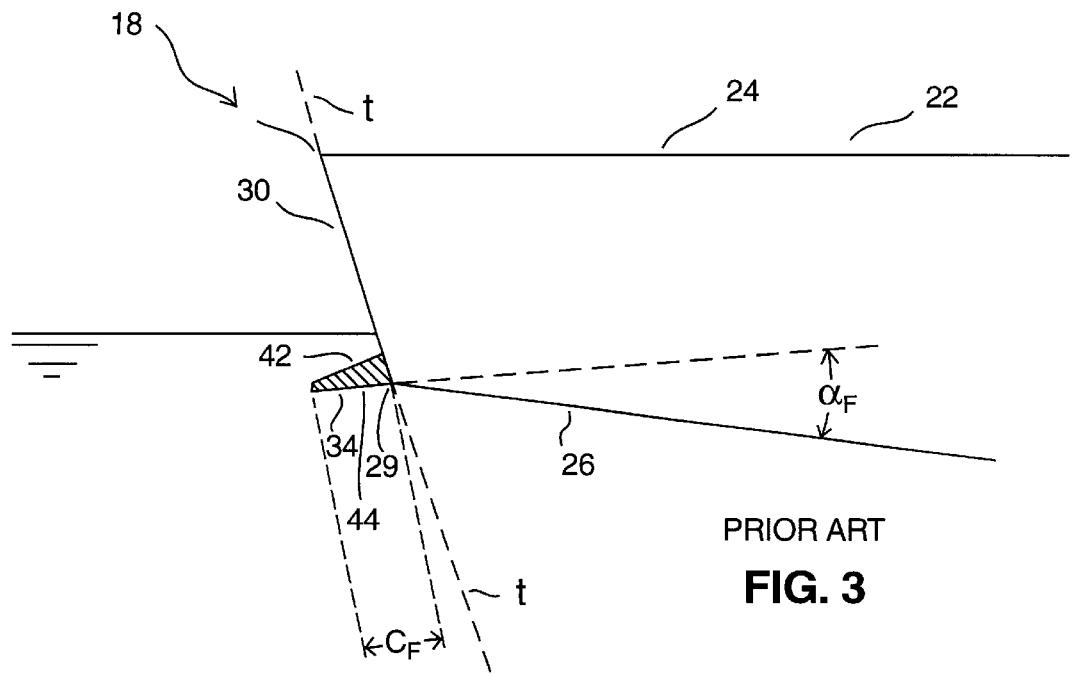
FIG. 3 is a view, similar to the view shown in FIG. 1, of the ship shown in FIG. 1, wherein the hullform is provided with a stern flap.
Figure 4:
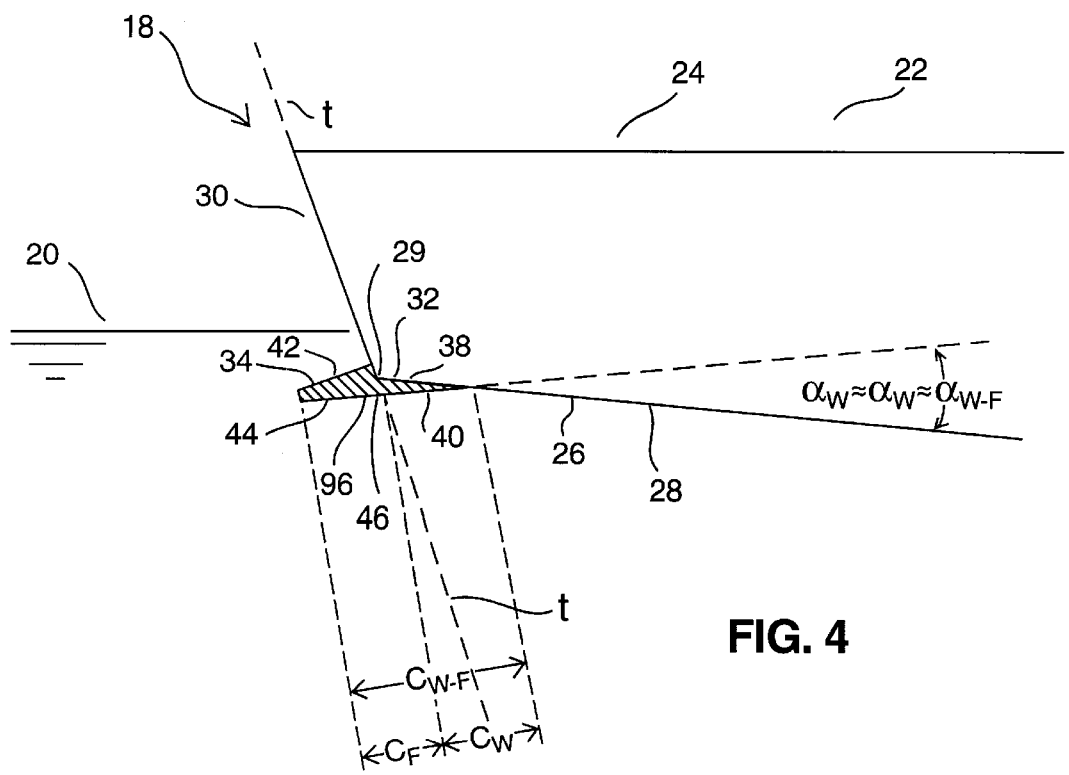
FIG. 4 is a view, similar to the view shown in FIG. 1, of the ship shown in FIG. 1, wherein the hullform is provided with an inventive combined wedge-flap.

With reference to FIG. 2, FIG. 3 and FIG. 4, each of these partial profiles displays additional structure in the afterbody of hull 22. As shown in FIG. 2, stern wedge 32 starts at a location forward of transom 30 and ends at transom 30. The entire wedge 32 is under hull bottom 28. As shown in FIG. 3, stern flap 34 starts at lower aft edge 29 and extends to a location aft of transom 30. As shown in FIG. 4, inventive combined stern wedge-flap 36 starts at a location forward of transom 30 and extends past transom 30 to a location aft of transom 30.

In FIG. 2, wedge 32 has upper wedge surface 38 and lower wedge surface 40. Wedge angle $\alpha_W$ is the angle of lower wedge surface 40 in relation to (local) buttock centerline 26. Wedge chord $c_W$ is the fore-and-aft (longitudinal) wedge length as measured across lower wedge surface 40. In FIG. 3, flap 34 has upper flap surface 42 and lower flap surface 44. Flap angle $\alpha_F$ is the angle of lower flap surface 44 in relation to (local) buttock centerline 26. Flap chord $c_F$ is the fore-and-aft (longitudinal) flap length as measured across lower flap surface 44.

The point of departure for each of wedge 32 and flap 34 is in the vicinity of edge 29. Wedge 32 differs from flap 34 principally in the respect that wedge 34 is situated under hull bottom 28, and does not extend aft of transom 30; typically, wedge 32 is inlaid into the plating of hull bottom 28. By contrast, lower flap surface 44 is an extension of the hull bottom 28 surface, flap 34 extending aft of transom 30.

In FIG. 4, inventive combined wedge-flap 36 comprises wedge 32 portion and flap 34 portion. Inventive combined wedge-flap 36 thus essentially manifests the respective contours of wedge 32 and flap 34 shown in FIG. 2 and FIG. 3, respectively, including upper surfaces 38 and 42 and lower surfaces 40 and 44. FIG. 4 is representative of the many inventive embodiments wherein lower wedge surface 40 and lower flap surface 44, to a substantial degree, are merged or integrated in approximately coplanar fashion, or in nearly coplanar, approximately parallel-stepped fashion, thereby effectively forming lower wedge-flap surface 46; meanwhile, upper wedge surface 38 and upper flap surface 42 have essentially retained their separate identities.

Wedge-flap angle $\alpha_{W-F}$ is the angle of lower wedge-flap surface 46 in relation to (local) buttock centerline 26. Wedge-flap chord $c_{W-F}$ is the fore-and-aft (longitudinal) inventive wedge-flap length as measured across lower wedge-flap surface 46. In this illustration, wedge-flap angle $\alpha_{W-F}$, wedge angle $\alpha_W$ and flap angle $\alpha_F$ are all approximately equal; wedge-flap chord $c_{W-F}$ approximately equals the sum of wedge chord $c_W$ and flap chord $c_F$.

Transom 30, substantially rectilinear, approximately defines imaginary infinite plane t. In inventive practice, generally, infinite plane t is an expedient approximation, albeit in some applications transom 30 will be characterized by a degree of curvilinearity in the vertical direction and/or the horizontal direction. It can be conceived that plane t bounds or limits wedge 32 in FIG. 2, flap 34 in FIG. 3, wedge 32 portion in FIG. 4, and flap 34 portion in FIG. 4.

In FIG. 2, wedge 32 is situated beneath hull bottom 28 so that lower wedge surface 40 is disposed at a downward wedge angle $\alpha_W$ with respect to centerline 26. Wedge 32 extends between a location proximate edge 29 and a location forward of infinite plane t. In FIG. 3, flap 34 projects from the stern so that lower flap surface 44 is disposed at a downward flap angle $\alpha_F$ with respect to centerline 26. Flap 34 extends between a location proximate edge 29 and a location aft of infinite plane t.

Analogously, in FIG. 4, wedge 32 portion is situated beneath hull bottom 28 so that lower wedge surface 40 is disposed at a downward wedge angle $\alpha_W$ with respect to centerline 26. Wedge 32 portion extends between a location proximate edge 29 and a location forward of infinite plane t. Flap 34 portion projects from the stern so that lower flap surface 40 is disposed at a downward flap angle $\alpha_F$ with respect to centerline 26. Flap 34 portion extends between a location proximate edge 29 and a location aft of infinite plane t.

Wedge angle $\alpha_W$, flap angle $\alpha_F$ and wedge-flap angle $\alpha_{W-F}$ are each referenced to the slope of local centerline buttock 26. In FIG. 4, since wedge angle $\alpha_W$ approximately equals flap angle $\alpha_F$, with some approximation lower wedge surface 40 can be considered to effectively blend with lower flap surface 44 so as to form lower wedge-flap surface 46 which is disposed at a downward wedge-flap angle $\alpha_{W-F}$ with respect to centerline 26, whereby wedge-flap angle $\alpha_{W-F} \approx$ wedge angle $\alpha_W \approx$ flap angle $\alpha_F$.

The physics pertaining to the operation of the inventive combined stern-wedge entails the combined effects of stern wedges and stern flaps. Hydrodynamic principles behind the operation of stern wedges are explained in the paper, supra, of May 1987 by Karafiath and Fisher. Hydrodynamic principles behind the operation of stern flaps are explained in the paper, supra, of November 1995 by Cusanelli and Forgach, and in the paper, supra, of December 1996 by Cusanelli. The principles of operation are similar for the stern wedge, the stern flap and the inventive combined wedge-flap, with the notable exception the inventive combined wedge-flap results in greater powering improvement than does either the wedge acting alone or the flap acting alone. The stern wedge, stern flap, or inventive combined stern wedge-flap is itself a drag producer under virtually all conditions; however, the beneficial interaction with the hull results in a net decrease in ship resistance and in required delivered power.

To briefly elaborate on the hydrodynamics involved, operation of any one of the three configurations (the stern wedge, the stern flap, the inventive combined stern-flap) causes the flow to slow down under the hull at a location extending from the aftmost portion of the ship to a point generally forward of the propellers. This decreased flow velocity will cause an increase in pressure, which in turn causes the following: (i) a drag on the flap, wedge or inventive combined wedge-flap; (ii) a forward thrust on the ship's afterbody; (iii) an upward force on the ship's afterbody; (iv) a decreased flow velocity and an increased pressure.

The drag on the flap, wedge or inventive combined wedge-flap increases the powering. The forward thrust which is generated on the ship's afterbody is greater than the drag (on the flap, wedge or inventive combined wedge-flap), and is responsible for most of the powering benefit; it has been estimated that, in some cases, this thrust accounts for more than 50% of the powering benefit. The upward force which is generated on the ship's afterbody results in a lowered trim angle and a slight rise in the center of gravity relative to the water surface. Generally, this upward force effect contributes 10% to 20% to the decreased powering. The decreased flow velocity and increased pressure extends to the top of the propeller disk; this is, in general, favorable to the powering (and cavitation) performance of the propeller.

In addition, the stern wave system is modified. The waves behind the ship appear flatter with a smaller rooster tail. Model test measurements show that the wave resistance is decreased. This effect may account for 10% to 25% of the decreased power. For solitary flap or inventive combined wedge-flap configurations, there is a physical lengthening of the ship's wetted length, which further enhances this wave resistance reduction.

A distinction should be drawn between the inventive hydrodynamic principles for a destroyer-type hull versus those for a high speed planing (or semi-planing) patrol-type boat. Planing boats, which attain speeds in the range of $F_n = 0.9$, experience large changes in trim (as much as two degrees), whereas destroyers exhibit trim changes on the order of only 0.2 degrees. The dynamic lift of a planing boat, and associated induced drag, are greatly affected by changes in trim. It is principally this change in trim which can reduce the planing boat's resistance. On a destroyer, the dynamic lift effects, compared to the total ship displacement, are much less than on a planing boat. It is a modification in the flow field around the afterbody of a ship which causes the principal changes in the resistance and the powering performance on a displacement hull.

Figure 5:
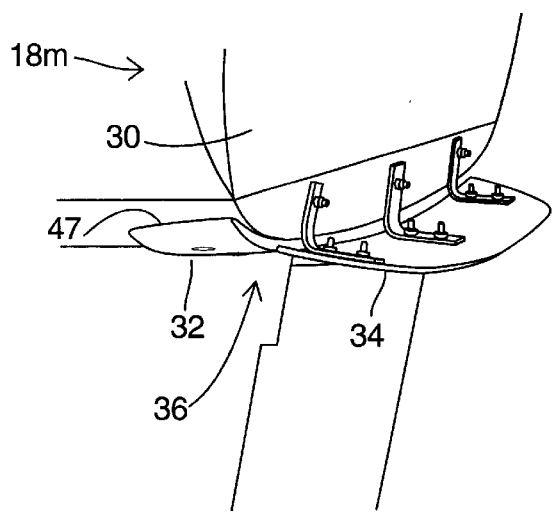
FIG. 5 is a schematic, partial (stern), perspective view of a U.S. Navy DDG 51 Class ship (destroyer) model which has been provided with an inventive combined wedge-flap; this design has been selected for the U.S. Navy DDG 51 Class destroyer fleet.
Figure 6:
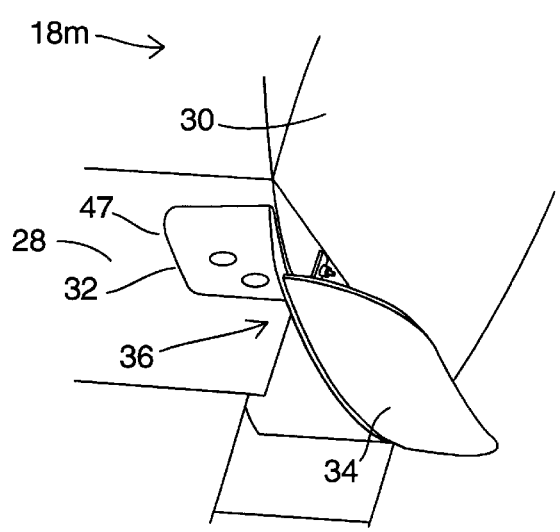
FIG. 6 is another schematic, partial (stern), perspective view of the ship model shown in FIG. 5.
Figure 7:
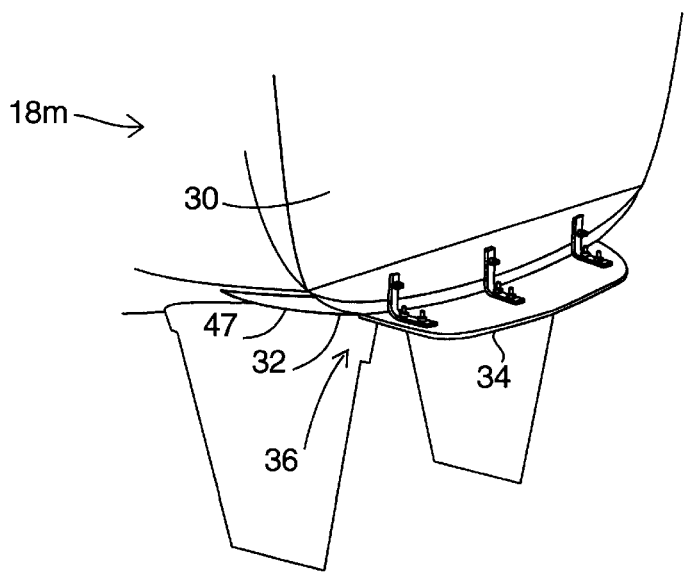
FIG. 7 is a schematic, partial (stern), perspective view of a ship model, similar to the ship model and view shown in FIG. 5, also showing the selected inventive combined wedge-flap design.

Reference now being made to FIG. 5, FIG. 6 and FIG. 7, resistance tests were conducted by the U.S. Navy in September 1996 at the Naval Surface Warfare Center, Carderock Division (NSWCCD), using DTMB (David Taylor Model Basin) ship Model 5513, for purposes of selecting an appropriate inventive combined wedge-flap design for the DDG 51 Class. Ship Model 5513, built to a scale ratio $\lambda = 20.2609$, is representative of the Arleigh Burke (DDG 51) Class Flight I, AEGIS Guided Missile Destroyer, which has LBP ("Length Between Perpendiculars") equal to 466 feet and Beam equal to 59.24 feet; hence, Model 5513 has LBP equal to 23 feet and Beam equal to 2.924 feet. Generally, the dimensions stated hereinbelow in relation to Model 5513 are full scale dimensions.

The uniqueness of the present invention resides especially in the combination of a stern flap with a stern wedge. To the inventors' knowledge, the combination of a stern wedge and a stern flap had never been tested by anyone prior to these U.S. Navy ship model tests. Presumably, the prevailing assumption in the art has been that both a stern wedge and a stern flap act on the same fluid, and hence that a combination of a stern wedge and a stern flap would provide no more benefit than would either a stern wedge acting alone or a stern flap acting alone, and may even be counterproductive.

These ship model tests were performed by the U.S. Navy at the fleet displacement of 8,900 tons. As depicted in FIG. 5, FIG. 6 and FIG. 7, DDG 51 ship model 18m is equipped with inventive combined wedge-flap 36, which includes wedge 32 portion and flap 34 portion. The inventive wedge-flap 36 configuration shown in FIG. 5 through FIG. 7 was ultimately selected for the DDG 51 destroyer fleet on the basis of these tests.

The design of stern wedge 32 portion for the DDG 51 destroyer had been established by the U.S. Navy previous to these ship model tests. Stern wedge 32 portion on the DDG 51 Class Flight I ship is designed to be an integral part of (inlaid into) the full scale hullform; however, at model scale, stern wedge 32, as shown, was a separate installed appendage. Wedge angle $\alpha_W$ for the designed DDG 51 stern wedge 34 portion was 13 degrees.

As revealed by FIG. 5 through FIG. 7, wedge 32 portion is symmetrically tapered slightly in both lateral directions so as to be thickest at centerline 26 (not shown but envisioned in FIG. 5 through FIG. 7), and to then be gradually thinned out toward both wedge extremities 47. Hence, wedge angle $\alpha_W$ typically is considered to represent such measurement where centerline 26 bisects wedge 32 portion, and is greater than any wedge 32 angle which would be measured at a noncentric location of wedge 32 portion. Upper wedge surface 38 flushly engages hull bottom 28, conforming to the curvilinear shape of hull bottom 28; in particular, wedge extremities 47 curve in conformance with the radial bilge shape of hull bottom 28.

Figure 8:
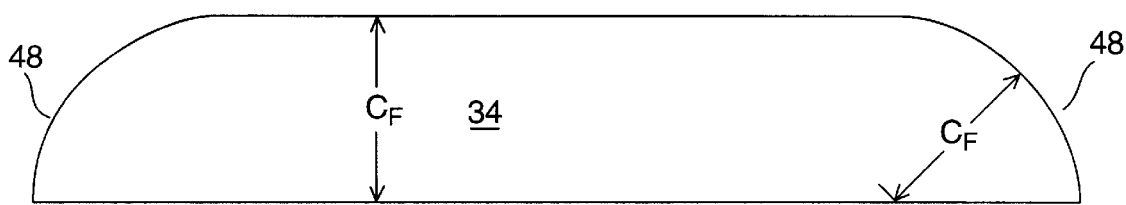
FIG. 8, FIG. 9 and FIG. 10 are schematic plan views of various shapes of the stern flap portion of the inventive combined wedge-flap which the U.S. Navy tested using ship models such as shown in FIG. 5, FIG. 6 and FIG. 7.
Figure 9:
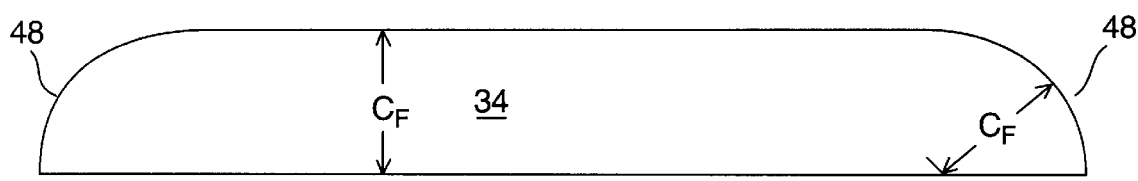
Figure 10:
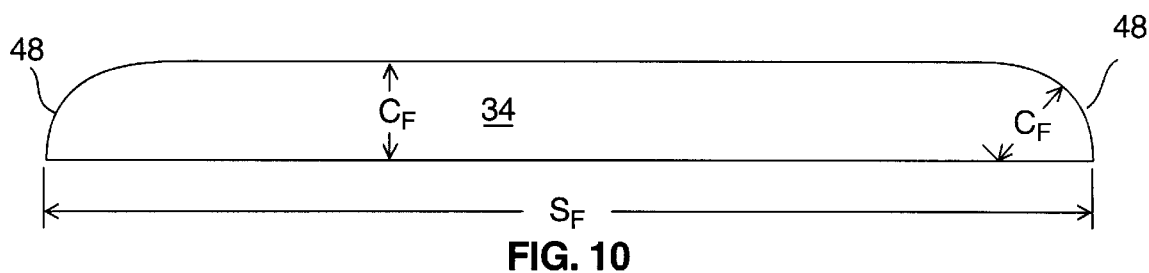

With reference to FIG. 8, FIG. 9 and FIG. 10, each of three stern flap 34 portion designs was evaluated during these tests in combination with, and situated behind, stern wedge 32 portion. Flap chord $c_F$ differed for each flap 34 portion design. Flap 34 portion shown in FIG. 8 had flap chord $c_F$=2.3 feet (0.7 meters), which represented about 0.5% of the ship LBP. Flap 34 portion shown in FIG. 9 had flap chord $c_F$=3.5 feet (10.7 meters), which represented about 0.75% of the ship LBP. Flap 34 portion shown in FIG. 10 had flap chord $c_F$=4.7 feet (1.43 meters), which represented about 1.0% of the ship LBP.

Flap span $s_F$ is the port-and-starboard (transverse) flap length. Each flap 34 portion shown in FIG. 8 through FIG. 10 had a flap span $s_F$=24 feet (8.35 meters), which was the maximum reasonably possible flap span $s_F$ across transom 30 without flap 34 portion impinging on the wake off the corners of transom 30, and without requiring significant curvature of flap 34 portion around the bilge radius. In order to simplify construction and reduce full scale flap manufacturing costs, flap ends 48 simply were rounded (radiused) so as to, in plan view, have a radius equal to flap chord $c_F$.

Figure 11:
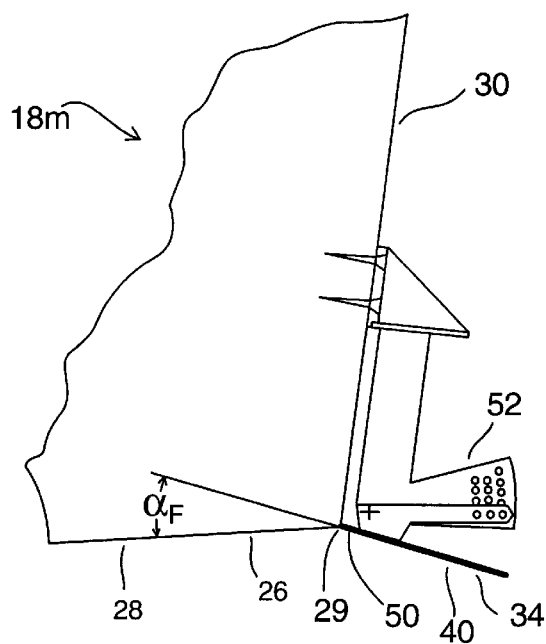
FIG. 11 is a schematic, partial (stern), side elevation view of a ship model such as shown in FIG. 5, FIG. 6 and FIG. 7, showing installation of the stern flap portion of the inventive combined wedge-flap.

Referring to FIG. 11, stern flap 34 portion was a custom fit metal plate attached at the stern of ship model 18m; the flap 34 portion on the real DD 51 ship is expected to have a more "structural" upper flap surface 44. The gap between flap 34 portion and transom 30 was bridged by small fairing strip 50, fastened to ship model 18m adjacent lower aft transverse edge 29, thereby preventing crossflow and pressure loss between transom 30 and the forward edge of flap 34 portion. Using angle adjusting bracket 52, flap angle $\alpha_F$ was tested in ±5 degree increments relative to lower wedge surface 40, in other words in ±5 degree increments with respect to a 13 degree flap angle $\alpha_F$ which equaled the 13 degree wedge angle $\alpha_W$. For illustrative purposes, flap angle $\alpha_F$ is shown in FIG. 11 to be adjusted to equal 20 degrees.

The stern flap 34 portion design shown in FIG. 10 was selected to be the one best suited for integration with the existing stern wedge 32 portion. This decision was premised on the desirability of maximizing potential annual energy savings, and was based on the experimental model test data and DDG 51 Class ship speed-time profile. The measured resistance for each stern flap 34 portion design, at each angle variation, across the speed range, was weighted by the DDG 51 speed-time mission profile, in order to generate an annual time-averaged resistance. These annual time-averaged resistance calculations were then compared to that of the baseline (wedge 32 portion, only) DDG 51. Based on this resistance comparison, stern flap 34 portion was selected to have flap chord $c_F$=1.0% ship LBP (4.7 feet, 1.4 meters), and to be situated at flap angle $\alpha_F$=13 degrees, parallel to lower wedge surface 42 of stern wedge 32 portion.

Figure 12:
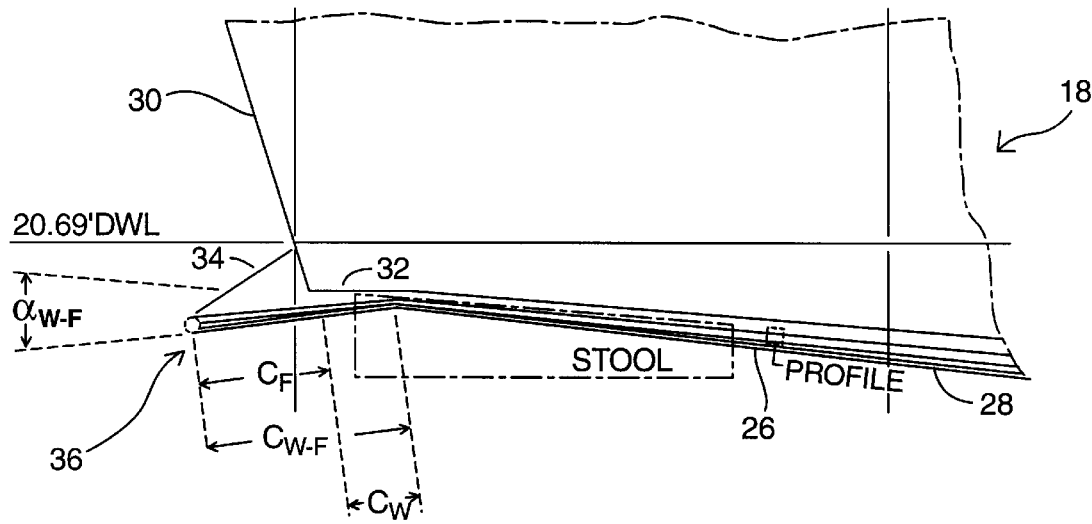
FIG. 12 is a schematic, partial (stern), side elevation view of a U.S. Navy DDG 51 Class ship which is provided with an inventive combined wedge-flap such as the inventive combined wedge-flap shown in FIG. 9.
Figure 13:
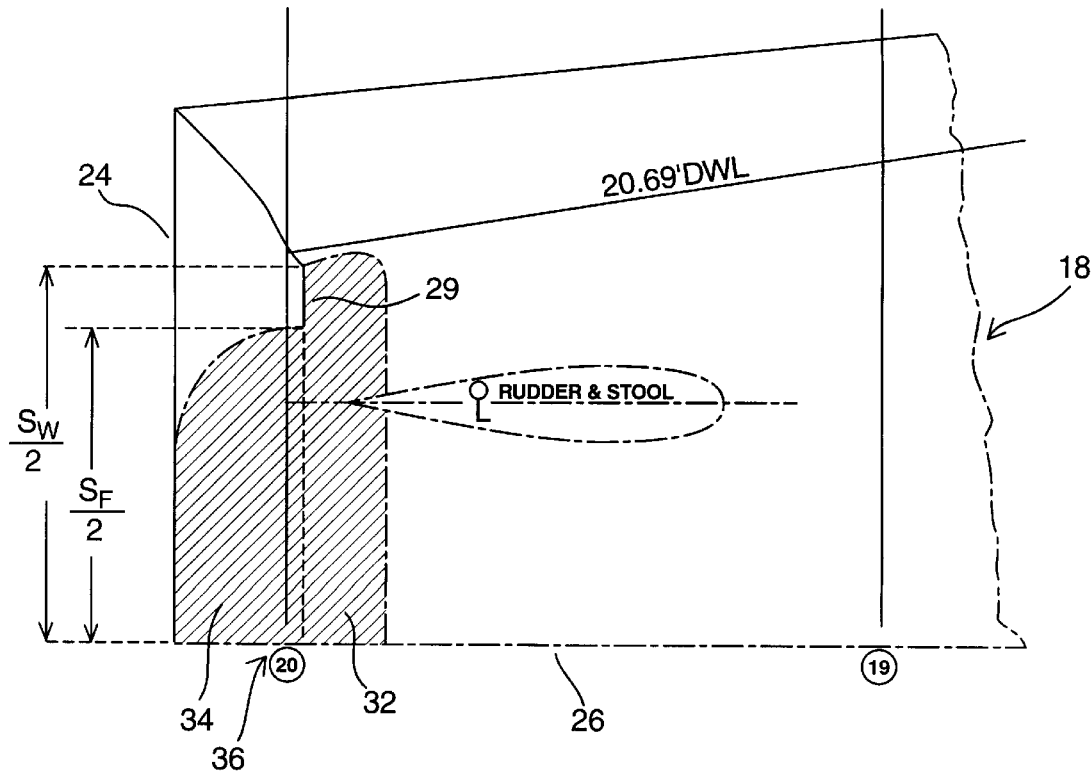
FIG. 13 is a schematic, partial (port and stern), top plan view of the ship which is shown in FIG. 10 to be provided with an inventive combined wedge-flap.

Accordingly, now referring to FIG. 12 and FIG. 13, the inventive combined wedge-flap 36 configuration which was selected for the DDG 51 destroyer fleet was characterized by the following parametric values: wedge-flap angle $\alpha_{W-F}$=13 degrees, in conformity with a 13 degree wedge angle $\alpha_W$ and a 13 degree flap angle $\alpha_F$; wedge-flap chord $c_{W-F}$=7.87 feet (2.4 meters); wedge chord $c_W$=3.17 feet (0.966 meters); flap chord $c_F$=4.7 feet (1.43 meters); flap span $s_F$=24 feet (8.35 meters); wedge span $s_W$, the port-and-starboard (transverse) wedge length, is nearly coextensive with the length of lower aft transverse edge 29. From the perspective shown in FIG. 13, it appears that the delimitation or demarcation between wedge 32 portion and flap 34 portion has approximate coincidence with lower aft transverse edge 29.

In inventive practice, the design of an inventive combined wedge-flap involves sizing both the wedge and flap portions, and selecting the most suitable geometry. The critical parameters for design geometry are: wedge angle $\alpha_W$; flap angle $\alpha_F$; wedge-flap angle $\alpha_{W-F}$; wedge chord $c_W$; flap chord $c_F$; wedge-flap chord $c_{W-F}$; wedge span $s_F$; flap span $s_F$.

All the U.S. Navy model-tested stern wedges, stern flaps and inventive combined wedge-flaps demonstrated similar trends in terms of the critical design parameters and their effects on ship resistance. At the low speeds, there is a resistance penalty associated with the device. At some intermediate speed, which varies with design, there is a "crossover" to reduced resistance. At higher speeds, there is further resistance reduction. In general, a longer chord length has a greater low speed resistance penalty, and the crossover point to reduced resistance is delayed to a greater ship speed, but the high speed resistance reduction is also greater. The same is generally true for increased angle: Low speed resistance penalty and crossover speed increase, while high speed resistance reduction also improves.

Initial inventive combined wedge-flap design includes determining the span across the transom. The inventive combined wedge-flap should span the maximum reasonable width possible across the transom, without impinging on the wake off the corners of the transom, and without requiring significant curvature around the bilge radius. In some instances, transom observations without the inventive combined wedge-flap installed can be invaluable in determining this maximum span.

Selection of a final inventive combined wedge-flap shape also includes determining planform shape with special attention to the outboard edges, transverse thickness variations, the use or elimination of a hard corner at the outboard edges, and the detailed fairing into the hull. For many inventive embodiments, a simple radiused corner treatment (in plan view) should be chosen to simplify construction and reduce full scale manufacturing costs. Experience indicates that the wedge portion should have a tapered thickness, with the greatest thickness (and thus the greatest angle) at its centerline. The tapering also allows for a favorable smooth transition to be achieved near the turn of the bilge, and elimination of undesirable hard corners. In inventive practice, attention to these additional design details will generally minimize low speed powering penalties, without compromising high speed performance.

The design of an inventive combined wedge-flap is affected greatly by mission requirements as well as hullform design. A compromise must be reached between improving high speed performance and minimizing low speed penalties. The particular ship's speed-time mission profile will dictate the relative importance of the high speed and low speed performances under consideration.

The inventive combined wedge-flap 36 design which was selected by the U.S. Navy for the DDG 51 as aforedescribed was then tested in both resistance and powering. The powering experiments were conducted with model propellers representative of the 17 feet (5.18 meters) diameter DDG 51 Class Flight I, Advanced Technology Demonstration (ATD) propeller design by the U.S. Navy at NSWCCD.

The resistance and the powering were each analyzed in terms of the following ratio:

SHIP HAVING INVENTIVE COMBINED WEDGE FLAP/SHIP HAVING NO WEDGE AND NO FLAP

According to the above ratio, the wedgeless, flapless ship thus represented the "baseline hull."

The experimental results showed that the reduction in delivered power by the inventive combined wedge-flap was approximately 1 to 3 percent greater than the reduction in resistance across the speed range. This has generally been the case for stern wedge and stern flap designs which have been model-tested to date by the U.S. Navy.

As demonstrated by Table 1, found hereinbelow, the predicted delivered power reduction of the inventive combined wedge-flap (vis-a-vis' a "no wedge—no flap" configuration) is quite marked, averaging about 6.25 percent over the speed range. A negative value in Table 1 indicates a decrease in shaft power; a positive value in Table 1 indicates an increase in shaft power. In the range of the DDG 51 maximum speed, the delivered power reduction is nearly 12 percent. It is noted that, since the full scale DDG 51 Flight I hull already features an inlayed stern wedge, a "no wedge—no flap" configuration is academic for such vessel.

The powering reduction for the inventive combined wedge-flap far exceeded what was achievable using either a solitary wedge or a solitary flap. It is theorized that this superior performance of the inventive combined wedge-flap was at least partially attributable to the effectively longer combined chord length, viz., wedge-flap chord $c_{W-F}$, of 7.87 feet (2.4 meters). The Model 5513 test data, collected during the selection process for the stern flap portion of the inventive combined wedge-flap intended for the DDG 51 destroyer, suggests that the longer effective chord length (wedge-flap chord $c_{W-F}$) resulted in better performance of the model.

To recapitulate, the predictions set forth in Table 1 are based on standard model self-propulsion tests conducted by the U.S. Navy at NSWCCD. The wedge-only data derived from tests using Model 5422, conducted in 1986. The flap-only data derived from tests using Model 5422-4, conducted in 1995. The inventive combined wedge-flap data derived from tests using Model 5513, conducted in September 1996. Except for small geometric variations, each of these models represents the 466 foot long DDG 51 and has a scale factor of 20.261. All of these tests conducted by the U.S. Navy were state-of-the-art ship model tests implementing standard accepted naval architectural ship model test procedures for predicting ship powering performance.

TABLE 1

Percent Change in Delivered Power on DDG 51 Ship Model

| SHIP SPEED (KNOTS) | PERCENT CHANGE IN DELIVERED POWER DUE TO WEDGE ONLY | PERCENT CHANGE IN DELIVERED POWER DUE TO FLAP ONLY | PERCENT CHANGE IN DELIVERED POWER DUE TO COMBINED WEDGE-FLAP |
|---|---|---|---|
| 0 | +0.8 | +1.4 | +2.2 |
| 12 | +0.6 | +0.2 | +0.8 |
| 14 | +0.5 | −0.7 | −0.2 |
| 16 | +0.3 | −1.1 | −0.8 |
| 18 | −1.4 | −2.7 | −4.0 |

TABLE 1-continued

Percent Change in Delivered Power on DDG 51 Ship Model

| SHIP SPEED (KNOTS) | PERCENT CHANGE IN DELIVERED POWER DUE TO WEDGE ONLY | PERCENT CHANGE IN DELIVERED POWER DUE TO FLAP ONLY | PERCENT CHANGE IN DELIVERED POWER DUE TO COMBINED WEDGE-FLAP |
|---|---|---|---|
| 20 | −4 | −3.8 | −7.6 |
| 22 | −5 | −4.6 | −9.4 |
| 24 | −5.7 | −6.0 | −11.3 |
| 26 | −5.9 | −5.6 | −11.2 |
| 28 | −4.8 | −5.5 | −10.1 |
| 30 | −5.7 | −6.2 | −11.6 |
| 32 | −6 | −6.3 | −11.9 |

The selected DDG 51 stern flap 34 portion design, when inventively installed in combination with the inlaid stern wedge 32 portion, exhibited an increased power in the range of 1.4% at 10 knots; this is less than the 3 to 4% usually associated with stern flaps installed alone. It is theorized that this was at least partially attributable to the stern flow already having been deflected to the 13 degree angle by the presence of stern wedge 32 portion; stern flap 34 portion is, in effect, at a zero degree angle of attack relative to this deflected flow. In general, flaps at zero degree positions fare well at low speeds.

As of now, twenty-seven DDG 51's have been equipped, according to the U.S. Navy's plan, with an inlaid stern wedge. It is expected that the inventive retrofit with the combined wedge-flap will result in a powering improvement over the wedge-only mode. For instance, Table 1 indicates that, at 30 knots, the inventive combined wedge-flap saves 11.6% in power relative to a ship having neither a wedge nor a flap; however, the power saving relative to the existing DDG 51 ships which are already equipped with a wedge is 11.6%−5.7%=5.9%.

The yearly power (and fuel) saving is calculated by applying the saving at a given ship speed to the number of hours that the ship operates at that speed as specified in the ship's mission profile. According to such calculations, the speed-time-averaged powering improvement (over the existing wedge-only mode) for the DDG 51 is 4.6%. According to engine fuel flow calculations, the annual fuel saving will be 3.8%, corresponding to $112,000 cost saving per ship. Retrofit costs are expected to be about $50,000, excluding dry docking costs. Thus, the cost of the inventive combined wedge-flap will be offset by less than one year's fuel saving. The total fuel saving for all 27 ships over their lifetime will be on the order of $100 million.

As previously noted herein, the results of the U.S. Navy's testing using ship Model 5513 suggest that the longer effective chord length (wedge-flap chord $c_{W-F}$) associated with inventive combined wedge-flap 36 yields better ship powering performance than either a shorter chord length (wedge chord $c_W$) associated with solitary wedge 32 would yield or a shorter chord length (flap chord $c_W$) associated with a solitary flap 34 would yield. This observation gives rise to the conjecture, dismissed by the inventors as explained hereinbelow, that either a very large solitary wedge 32 or a very large solitary flap 34 would represent a viable alternative to inventive combined wedge-flap 36. A large wedge 32 alone or a large flap 34 alone would have practical as well as hydrodynamic disadvantages.

Inventive combined wedge-flap 36 is structurally advantageous relative to a large solitary flap 34 in that inventive combined wedge-flap 36 is a compact unit which minimizes the bending moments. For the DDG 51 destroyer, wedge-flap chord $c_{W-F}$ is 7.9 feet, with 4.7 feet (corresponding to flap chord $c_F$) cantilevered behind transom 30. An equivalent size solitary flap 34 (having flap chord $c_F$=7.9 feet) would be cantilevered 7.9 feet behind transom 30, and consequently would have larger bending moments.

Furthermore, such a large solitary flap 34 (e.g., having flap chord $c_F$=7.9 feet) might be impractical. The 4.7 foot cantilevered portion (corresponding to flap chord $c_F$) of inventive combined wedge-flap 36 would be constructed by effectuating techniques similar to those effectuated for the simple construction of a bilge keel on this size ship. By contrast, the 7.9 foot chord solitary flap 34 would require more sophisticated construction and analysis of forces. Indeed, even battleships do not have 7.9 foot bilge keels. The structural weight of such a large solitary flap 34 would be greater than that of an equivalently chorded inventive combined wedge-flap 36.

Moreover, such a large solitary flap 34 could interfere with some ship operations. The large solitary flap 34 would extend beyond upper aft transverse edge 27 and might interfere with some towed array operations. The overall ship length would be increased.

A hydrodynamic disadvantage of a large solitary wedge 32 is the resultant significantly increased immersion of transom 30, leading to poor performance at low speeds (below 18 knots). A large solitary wedge 32 having a 7.9 wedge chord $c_W$, for example, would start 7.9 feet forward of transom 30; however, because of the slope of buttock centerline 26 (or of the buttocks, in general) such a fore starting point would be lower than the fore starting point of the wedge 32 portion of inventive combined wedge-flap 36, assuming wedge angle $\alpha_W$=wedge-flap angle $\alpha_{W-F}$. In other words, if wedge angle $\alpha_W$ (the inclination of lower flap surface 40 of large solitary wedge 32) approximately equals wedge-flap angle $\alpha_{W-F}$ (the inclination of lower wedge-flap surface 46 of inventive combined wedge-flap 36), then the trailing position of large solitary wedge 32 will be lower than that of inventive combined wedge-flap 36 because of the lower forward starting point.

Hence, a large solitary wedge 32 would be characterized by increased immersion of transom 30 and poor low speed performance. Model ship tests which the U.S. Navy has conducted using varying solitary wedge sizes have demonstrated that the larger solitary wedges have associated therewith increased low speed powering penalties. The low speed performance is critical because the ship operates at these low speeds a high percentage of the time.

From the retrofit application standpoint for a ship such as the DDG 51, a large solitary wedge 32 is undesirable because of the increased construction costs as compared with the construction costs for an inventive combined wedge-flap 36. Only the flap 34 portion of inventive combined wedge-flap 36 need be added to the existing solitary wedge 32 in order to make the inventive combined wedge-flap 36 configuration. Flap 34 portion of inventive combined wedge-flap 36 is easy to construct because such construction involves the welding of plates which are at large angles to each other and to transom 30; conventional welding techniques can be used in such construction. On the other hand, the welding of the leading edge of a large solitary wedge 32 would require that a more expensive and intricate "slot weld" technique be implemented, due to the relatively small 10 to 15 degree angle (corresponding to wedge angle $\alpha_W$ with respect to centerline 26) which solitary wedge 32 forms relative to hull bottom 28. Retrofit of a large solitary flap 34 is not a practical option for the DDG 51, as this would require removal of the existing solitary wedge 32 (which is inlaid into the hull bottom 28 plating).

The inventive combined wedge-flap can be applied to a new ship design or retrofitted to an existing ship design. An inventive combined wedge-flap can have the greatest impact on ship design if its performance benefit is recognized early in the design process. Regardless, it is to be expected that the decrease in power associated with the inventive combined wedge-flap will exceed the decrease in power associated with either a solitary wedge or a solitary flap.

The inventive combined wedge-flap is appropriate for retrofit to several U.S. Navy cruiser/destroyer and frigate type hulls other than the DDG 51. For instance, early 1980's ship model tests on the DD 963/CG 47 hullform demonstrated a maximum 2% powering improvement due to a solitary stern wedge; this solitary wedge design was not adopted, and these ships as of today do not have a stern wedge. Incidentally, examination of this wedge design indicates that it was a somewhat crude design by today's standards; it is believed that a wedge designed today would give at least a 4% reduction in power.

Model powering experiments were recently conducted by the U.S. Navy on the same DD 963/CG 47 hullform. A solitary stern flap (i.e., with no wedge) demonstrated a maximum 9% reduction in power. An inventive combined wedge-flap was not tested in relation to this model; however, it is believed that an inventive combined wedge-flap would result in a maximum power reduction greater than 9%.

Generally speaking, a stern wedge, a stern flap or an inventive combined stern wedge-flap will begin to manifest powering reduction effectiveness at lower ship speeds and will manifest maximum powering reductions at higher ship speeds. In the case of the above-noted testing by the U.S. Navy of the DD 963/CG ship model having a solitary flap, the solitary flap commenced powering reduction effectiveness in the 14 to 16 knots speed range, and the maximum power reduction occurred at 29 to 30 knots. It is believed that an inventive combined wedge-flap would commence powering reduction effectiveness at lower speeds than the 14 to 16 knots associated with the solitary flap configuration.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A combination for affecting the hydrodynamics of a hullform having a hull aftside and a hull underside which converge at a stern corner, said combination comprising wedge means and flap means, said wedge means being below said hull underside and at least substantially before said hull aftside, said flap means being at least substantially behind said hull aftside, said wedge means having a wedge undersurface and a wedge aft-periphery, said flap means having a flap undersurface and a flap fore-periphery, said wedge aft-periphery and said flap fore-periphery each being contiguous said stern corner, said hull underside having associated therewith an approximate longitudinal bisector passing therethrough, said wedge undersurface and said flap undersurface each being obliquely oriented with respect to said approximate longitudinal bisector.

2. A combination as in claim 1, wherein:
said wedge undersurface is oriented at a wedge angle with respect to said approximate longitudinal bisector;

said flap undersurface is oriented at a flap angle with respect to said approximate longitudinal bisector;

said wedge means is characterized by said wedge angle, the wedge chord, the wedge span, the wedge planform shape and the wedge thickness shape, said wedge chord being taken along said wedge undersurface;

said flap means is characterized by said flap angle, the flap chord, the flap span, the flap planform shape and the flap thickness shape, said flap chord being taken along said flap undersurface; and at least one design parameter for said combination is selected from the group of design parameters consisting of said wedge angle, said wedge chord, said wedge span, said wedge planform shape, said wedge thickness shape, said flap angle, said flap chord, said flap span, said flap planform shape and said flap thickness shape.

3. A combination as in claim 2, wherein said wedge means includes at least one faired area whereby at least one of said wedge planform shape and said wedge thickness shape includes configurational fairing into said hull underside at said fairing area.

4. A combination as in claim 3, wherein at least one said faired area is selected from the group of areas consisting of an area of said wedge means which is outboard of said approximate longitudinal bisector and an area of said wedge means which is in the vicinity of said stern corner.

5. A combination as in claim 1, wherein said wedge undersurface is oriented at a wedge angle with respect to said approximate longitudinal bisector, said flap undersurface is oriented at a flap angle with respect to said approximate longitudinal bisector, and said wedge angle and said flap angle are approximately equal to each other.

6. A combination as in claim 5 wherein, in effect, said wedge undersurface and said flap undersurface form a wedge-flap undersurface which is oriented at a wedge-flap angle with respect to said approximate longitudinal bisector, so that said wedge angle, said flap angle and said wedge-flap angle are approximately equal to each other.

7. A combination as in claim 6, wherein:

said wedge means is characterized by said wedge angle, the wedge chord, the wedge span, the wedge planform shape and the wedge thickness shape, said wedge chord being taken along said wedge undersurface;

said flap means is characterized by said flap angle, the flap chord, the flap span, the flap planform shape and the flap thickness shape, said flap chord being taken along said flap undersurface;

said wedge-flap means is characterized by said wedge-flap angle and the wedge-flap chord, said wedge-flap chord being taken along said wedge-flap undersurface; and at least one design parameter for said combination is selected from the group of design parameters consisting of said wedge angle, said wedge chord, said wedge span, said wedge planform shape, said wedge thickness shape, said flap angle, said flap chord, said flap span, said flap planform shape, said flap thickness shape, said wedge-flap angle and said wedge-flap chord.

8. Auxiliary structure for enhancing the powering of a marine vessel having a hull which includes a hull bottom and a substantially rectilinear transom, said hull bottom approximately defining a buttock centerline, said transom approximately defining an imaginary infinite plane, said hull bottom and said transom forming a stern junction, said structure comprising:

a wedge portion having an upper wedge surface and a lower wedge surface, said wedge portion situated beneath said hull bottom so that said lower wedge surface is disposed at a downward wedge angle with respect to said centerline, said wedge portion extending between a location proximate said junction and a location forward of said infinite plane; and a flap portion having an upper flap surface and a lower flap surface, said flap portion projecting from said stern so that said lower flap surface is disposed at a downward flap angle with respect to said centerline, said flap portion extending between a location proximate said stern junction and a location aft of said infinite plane.

9. Auxiliary structure as in claim 8 which comprises a wedge-flap unit for hydrodynamically effectuating said enhancing, said wedge-flap unit including said wedge portion and said flap portion.

10. Auxiliary structure as in claim 9, wherein:

said wedge portion has a wedge chord length which is measured across said lower wedge surface;

said flap portion has a flap chord length which is measured across said lower flap surface;

said wedge portion has a wedge span length;

said flap portion has a flap span length;

said wedge portion has a wedge through-thickness contour which is defined by the relation between said upper wedge surface and said lower wedge surface;

said flap portion has a flap through-thickness contour which is defined by the relation between said upper flap surface and said lower flap surface;

said wedge portion has a wedge planform contour which is defined by the perimeter of said wedge portion;

said flap portion has a flap planform contour which is defined by the perimeter of said flap portion; and at least one of said downward wedge angle, said downward flap angle, said wedge chord length, said flap chord length, said wedge span length, said flap span length, said wedge through-thickness contour, said flap through-thickness contour, said wedge planform contour and said flap planform contour has been considered for configuring said wedge-flap unit.

11. Auxiliary structure as in claim 10, wherein said wedge-flap unit is configured so as to include at least one section which is faired with respect to said hull.

12. Auxiliary structure as in claim 10, wherein said downward wedge angle approximately equals said downward flap angle, said wedge-flap unit thereby effectively having a lower wedge-flap surface which includes said lower wedge surface and said lower flap surface, said lower wedge-flap surface extending between said location forward of said infinite plane and said location aft of said infinite plane so as to transcend said infinite plane.

13. Auxiliary structure as in claim 12, wherein said lower wedge-flap surface has a wedge-flap chord length which is measured across said lower wedge-flap surface and which approximately equals the sum of said wedge chord length and said flap chord length.

14. Method for enhancing the powering of a marine vessel having a hull which includes a hull bottom and a substantially rectilinear transom, said hull bottom approximately defining a buttock centerline, said transom approximately defining an imaginary infinite plane, said hull bottom and said transom forming a stern junction, said method comprising:

providing a wedge portion having an upper wedge surface and a lower wedge surface, said wedge portion situated beneath said hull bottom so that said lower wedge surface is disposed at a downward wedge angle with respect to said centerline, said wedge portion extending between a location proximate said junction and a location forward of said infinite plane; and providing a flap portion having an upper flap surface and a lower flap surface, said flap portion projecting from said stern so that said lower flap surface is disposed at a downward flap angle with respect to said centerline, said flap portion extending between a location proximate said stern junction and a location aft of said infinite plane.

15. Method for enhancing as in claim 14, wherein said providing a wedge portion includes selectively disposing said wedge portion at said downward wedge angle and selectively configuring said wedge portion in accordance with at least one of the following wedge variables:

wedge chord length, said wedge chord length being measured across said lower wedge surface;

wedge span length;

wedge through-thickness contour, said wedge through-thickness contour being defined by the relation between said upper wedge surface and said lower wedge surface; and wedge planform contour, said wedge planform contour being defined by the perimeter of said wedge portion.

16. Method for enhancing as in claim 14, wherein said providing a flap portion includes selectively disposing said flap portion at said downward flap angle and selectively configuring said flap portion in accordance with at least one of the following flap variables:

flap chord length, said flap chord length being measured across said lower flap surface;

flap span length;

flap through-thickness contour, said flap through-thickness contour being defined by the relation between said upper flap surface and said lower flap surface; and flap planform contour, said flap planform contour being defined by the perimeter of said flap portion.

17. Method for enhancing as in claim 16, wherein said providing a wedge portion includes selectively disposing said wedge portion at said downward wedge angle and selectively configuring said wedge portion in accordance with at least one of the following wedge variables:

wedge chord length, said wedge chord length being measured across said lower wedge surface;

wedge span length;

wedge through-thickness contour, said wedge through-thickness contour being defined by the relation between said upper wedge surface and said lower wedge surface; and wedge planform contour, said wedge planform contour being defined by the perimeter of said wedge portion.

18. Method for enhancing as in claim 17, wherein said providing said wedge portion includes selectively fairing at least one part of said wedge portion with respect to said hull bottom.

* * * * *